US012134904B2

(12) United States Patent
Huth et al.

(10) Patent No.: US 12,134,904 B2
(45) Date of Patent: Nov. 5, 2024

(54) APPARATUS FOR OUTPUT OF A FLUID PROCESS MATERIAL

(71) Applicant: Putzmeister Engineering GmbH, Aichtal (DE)

(72) Inventors: Tobias Huth, Stuttgart (DE); Traugott Rieger, Weil im Schönbuch (DE)

(73) Assignee: Putzmeister Engineering GmbH, Aichtal (DE)

( * ) Notice: Subject to any disclaimer, the term of this patent is extended or adjusted under 35 U.S.C. 154(b) by 341 days.

(21) Appl. No.: 17/472,841

(22) Filed: Sep. 13, 2021

(65) Prior Publication Data

US 2021/0404195 A1 Dec. 30, 2021

Related U.S. Application Data

(63) Continuation of application No. PCT/EP2020/058290, filed on Mar. 25, 2020.

(30) Foreign Application Priority Data

Mar. 27, 2019 (DE) ..................... 10 2019 107 833.4

(51) Int. Cl.
*E04G 21/04* (2006.01)
*B33Y 30/00* (2015.01)
*B33Y 50/02* (2015.01)

(52) U.S. Cl.
CPC .......... *E04G 21/0436* (2013.01); *B33Y 30/00* (2014.12); *E04G 21/0463* (2013.01); *B33Y 50/02* (2014.12)

(58) Field of Classification Search
CPC ............ E04G 21/0436; E04G 21/0463; E04G 21/025; E04G 21/0445; E04G 2021/049;
(Continued)

(56) References Cited

U.S. PATENT DOCUMENTS 5,266,021 A * 11/1993 Jacobson .............. B29C 48/302
425/384
5,848,871 A * 12/1998 Thiessen ................ B65G 65/46
414/607
(Continued)

FOREIGN PATENT DOCUMENTS

CN 204728708 U 10/2015
CN 106639324 A 5/2017
(Continued)

OTHER PUBLICATIONS

English translation of the International Search Report, PCT/ EP2020/ 058290, dated Jun. 24, 2020, 2 pages.
(Continued)

*Primary Examiner* — Patrick C Williams
(74) *Attorney, Agent, or Firm* — Bose McKinney & Evans LLP (57) ABSTRACT

An apparatus for the output of a fluid process material, in particular a process material in the form of concrete, mortar or adhesive, has a distributor boom comprising a plurality of boom arms, connected to each other at joints, having a process material delivery line formed by a plurality of pipe segments, which are preferably joint-connected to each other by pipe bends and rotating couplings. The delivery line is guided along the individual boom arms and fixed thereto. A tool, which is received on the distributor boom, has a device for the output of the process material. The tool has a buffer vessel, which receives the process material from the process material delivery line, and an output element for the output of the process material, fed from the buffer vessel, at an output location.

22 Claims, 5 Drawing Sheets

(58) Field of Classification Search
CPC ......... B33Y 30/00; B33Y 50/02; B33Y 10/00;
B33Y 80/00
See application file for complete search history.

(56) References Cited

U.S. PATENT DOCUMENTS

| | | | |
|---|---|---|---|
| 6,871,667 B2* | 3/2005 | Schwing | E04G 21/04 |
| | | | 141/387 |
| 7,762,271 B2* | 7/2010 | Funk | E04G 21/0436 |
| | | | 137/1 |
| 2004/0052627 A1 | 3/2004 | Rau et al. | |
| 2005/0278099 A1 | 12/2005 | Benckert et al. | |
| 2013/0295338 A1 | 11/2013 | Keating et al. | |
| 2020/0048919 A1* | 2/2020 | Diebold | F15B 11/16 |

FOREIGN PATENT DOCUMENTS

| | | | | |
|---|---|---|---|---|
| DE | 100 60 077 A1 | 6/2002 | | |
| DE | 102 40 180 A1 | 3/2004 | | |
| DE | 10 2017 110 586 A1 | 11/2018 | | |
| EP | 1319110 B1 | 3/2008 | | |
| EP | 2886277 A1 | 6/2015 | | |
| EP | 2867531 B1 | 8/2016 | | |
| GB | 2267110 A | 11/1993 | | |
| JP | 2015-221992 A | 12/2015 | | |
| KR | 2017137434 A | * | 12/2017 | ............... E02F 5/30 |
| WO | WO 2013/012624 A1 | 1/2013 | | |
| WO | WO 2015/065936 A2 | 5/2015 | | |

OTHER PUBLICATIONS

Nather, et al. Concrete 3D printing—feasibility studies on continuous and formwork-free construction processes through 3D forming of fresh concrete, 2017, Fraunhofer IRB Verlag, Stuttgart, Germany.
Objection to EP 3 947 861, Nov. 15, 2023.

* cited by examiner

Fig.6

APPARATUS FOR OUTPUT OF A FLUID PROCESS MATERIAL

CROSS REFERENCE TO RELATED APPLICATIONS

This is a continuation of PCT/EP2020/058290, filed Mar. 25, 2020, which claims priority to DE 10 2019 107 833.4, filed on Mar. 27, 2019, the entire disclosures of which are both hereby incorporated herein by reference.

BACKGROUND

The present disclosure relates to an apparatus for the output of a fluid process material, in particular a process material in the form of concrete, mortar, plaster, or adhesive mixed with quartz sand, comprising a distributor boom designed as an articulated boom and comprising a plurality of boom arms, connected to each other at joints, having a process material delivery line consisting of a plurality of pipe segments, which are joint-connected to each other by pipe bends and rotating couplings, are guided along the individual boom arms and are fixed thereto, comprising a process material conveyor pump designed as a piston pump or as a rotor hose pump, which is used for the feed of the process material into the process material delivery line, and a tool which is received on the distributor boom and has a device for the output of the process material.

Such an apparatus is known from EP 1 319 110 B1. There, a truck-mounted concrete pump having a distributor boom is described, which is designed for the output of concrete as a process material. The truck-mounted concrete pump comprises a distributor boom with an articulated boom composed of a plurality of boom arms, the boom arms of which can be pivoted to a limited extent about respectively horizontal and parallel articulated axes by means of a drive unit. The articulated boom of the truck-mounted concrete pump carries a process material delivery line, which opens into an end hose attached to the boom tip of the distributor boom as a tool having a device for the output of the process material.

Formworks that are filled with concrete are conventionally used to produce structures made of concrete. These formworks are complex and expensive to produce and they have to be removed with considerable effort after the concrete has hardened. As with the industrial production of workpieces, so-called 3D printing is also finding its way into the production of structures.

SUMMARY

The embodiments disclosed herein provide an apparatus that can be used for the production of structures by means of so-called generative manufacturing processes.

The described embodiments employ the idea that the continuous application of a process material, for example, preferably quick-hardening concrete, mortar, or adhesive, with a tool received on a distributor boom, makes it possible to build a structure in layers by moving the tool. The inventors have recognized that a structure can be applied in layers with high precision by providing the process material to the structure with a constant mass flow rather than in a pulsed manner. The inventors therefore have proposed that the tool having the device for the output of the process material have a buffer vessel, to which the process material can be applied from the process material delivery line, and has a holding volume for the buffering of process material that is fed in a pulsed manner via the process material delivery line, and contains an output element for the output of the process material, fed from the buffer vessel, at an output location.

By providing process material at precisely defined positions on a structure, it is possible to manufacture structures without complex, stationary formwork and without stationary or mobile scaffolding or lifting platforms on which construction workers perform manual tasks.

In particular, since the tool having the device for the output of the process material contains a conveying apparatus for the continuous feed of the process material from the buffer vessel to the output element, precise metering of a process material mass flow output on a structure can be ensured.

In one embodiment, the conveying apparatus has a casing which has a cavity which is connected to the receiving volume of the buffer vessel via an opening in the bottom of the buffer vessel and which communicates with the output element. Also disclosed is an embodiment wherein at least one screw conveyor for the continuous feed of the process material to the output element is arranged in the cavity of the casing. The conveying apparatus can be designed as a compressed air conveyor. In particular, the output element can be designed as a nozzle which forms the process material. It is advantageous in this case if control means, e.g., a control system that includes a controller, are provided for changing the setting of the conveying apparatus in order to allow the process material mass flow on a structure to be varied.

By providing means for displacing a process material outlet opening of the nozzle relative to the buffer vessel, the location of the process material mass flow applied to a structure can be changed without large masses having to be moved for this purpose.

A preferred embodiment provides that the tool is rotatably mounted in a rotating joint on the distributor boom. The rotating joint can have a horizontal axis of rotation. In particular, the tool can have a holding arm connected to the rotating joint. For moving the tool, having the device for the output of the process material on the holding arm about the axis of rotation, there is advantageously a drive means. The drive means can, for example, take the form of a hydraulic drive having a hydraulic cylinder connected to a boom arm, which acts on a first deflection lever arrangement connected to the holding arm, which deflection lever arrangement is received in a rotating joint comprising a first horizontal axis of rotation on a link arrangement rotatably mounted on the boom arm about a further horizontal axis of rotation, the deflection lever arrangement transmitting a torque introduced from the hydraulic cylinder about the first horizontal axis of rotation to the holding arm. A quick hitch is advantageous for the quick and easy detachable connection of the holding arm to a portion of the tool comprising the buffer vessel and the output element. This measure allows the buffer vessel and the output element of the tool to be exchanged quickly. This measure also allows different tool portions with different functionalities to be picked up on the holding arm, such as a saw or a load handling means instead of the buffer vessel and the output element, or a connection arm with a concrete feed line and an end hose.

It is also possible for the process material delivery line to have a rotating coupling with an axis of rotation which is coaxial relative to the axis of rotation of the rotating joint receiving the tool having the device for the output of the process material.

Another embodiment of an apparatus for the output of a fluid process material can contain a system for the open-and/or closed-loop control of the position and orientation of the tool for the output of the process material by moving it about the axis of rotation. The system for the open- and/or closed-loop control of the position and orientation of the tool can in particular contain a position and orientation sensor for detecting the position and orientation of the output element and/or an angle sensor for detecting a rotation angle of the holding arm relative to the boom arm receiving the tool having the device for the output of the process material in the rotating joint.

The tool can be connected to the process material delivery line. It is advantageous if the tool contains means for further processing the process material conveyed through the process material delivery line, in particular means for feeding process material additives into the buffer vessel. The buffer vessel is preferably funnel-shaped.

It should be noted that the tool having the device for the output of the process material is advantageously arranged at the boom tip of the distributor boom or in the region of the boom tip of the distributor boom.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

Figure 1:
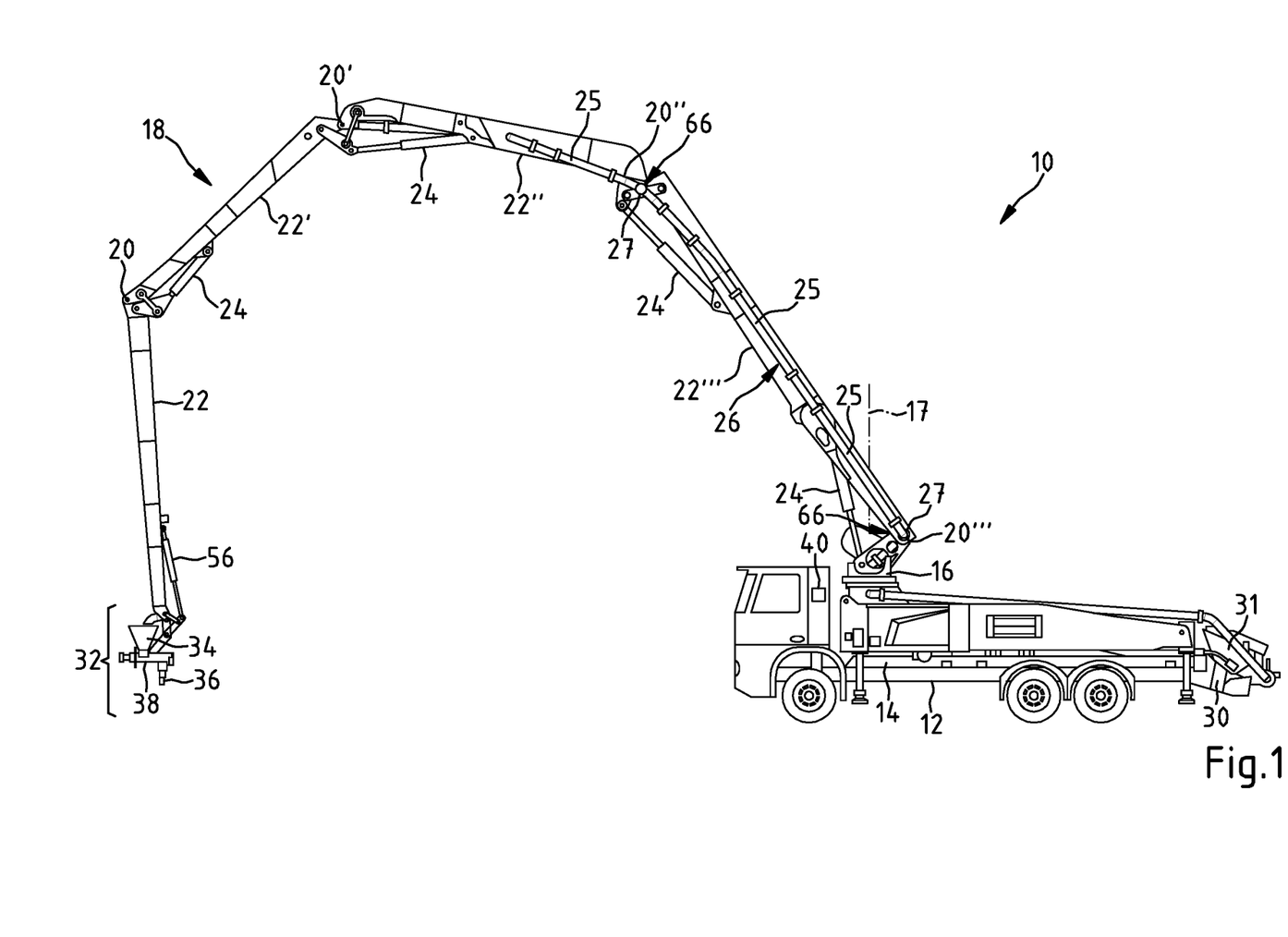
FIG. 1 is a side view of a truck-mounted pump having a distributor boom and a device for the output of process material.

The truck-mounted concrete pump 10 in FIG. 1 is a large-capacity robot. The truck-mounted concrete pump is used for the output of a fluid process material, for example, ready-mixed concrete or mortar, but also plaster or flowable adhesive, in particular adhesive that is mixed with a filler material, for example, quartz sand. The truck-mounted concrete pump has a chassis 12 having a substructure 14 which carries a distributor boom 18 which can be folded out, for example, to a length of 60 m. The distributor boom 18 is an articulated boom. It is received on the substructure 14 on a boom pedestal 16 and has joints 20, 20', 20'', and 20''' in which the boom arms 22, 22', 22'', and 22''' can be moved by means of drive units 24 designed as hydraulic cylinders, in each case a horizontal axis of rotation. On the boom pedestal 16, the distributor boom 18 can be rotated about a vertical axis of rotation 17 using a hydraulic drive (not shown).

The distributor boom 18 contains a process material delivery line 26 having pipe segments 25 which are connected via rotating couplings 66 and pipe bends 27. The process material delivery line 26 communicates with a hydraulic process material conveyor pump 30. The process material conveyor pump 30 has a material feed vessel 31 for receiving process material. The process material conveyor pump 30 is a piston pump, for example a piston pump as described in EP 2 867 531 B1 in paragraph [0014] with reference to FIGS. 3a to 3d as a two-cylinder thick matter pump, the disclosure of which is hereby incorporated herein by reference. Such a piston pump contains two feed cylinders in which two opposing feed pistons are moved, which alternately move the process material from the material feed vessel through a pipe switch into the process material delivery line 26. The process material conveyor pump 30 can, however, in principle also be another pump suitable for pumping thick matter, for example, a rotor hose pump, as described in WO 2013/12624 A1 with reference to FIGS. 1 to 7 on pages 3 to 10, the disclosure of which is hereby incorporated herein by reference.

The distributor boom 18 carries a tool 32 having a device for the output of the process material. On the distributor boom 18, the tool 32 can be pivoted about a horizontal axis of rotation by means of a hydraulic drive which may take the form of a hydraulic cylinder 56.

The device for the output of the process material in the tool 32 has a funnel-shaped buffer vessel 34. The process material delivery line 26 opens into the buffer vessel 34. The buffer vessel 34 can thus be acted upon by the process material fed through the process material delivery line 26. The buffer vessel 34 has a receiving volume which allows the process material fed in a pulsed manner through the process material delivery line 26 to be buffered. The device for the output of the process material in the tool 32 has an output element 36 designed as a nozzle and contains a conveying apparatus 38 for the continuous feed of the process material buffered in the buffer vessel 34 from the buffer vessel 34 to the output element 36.

The truck-mounted concrete pump 10 has a system for controlling the process material conveyor pump 30 and the tool 32 as well as the drive units 24 in the distributor boom 18 for moving the boom arms 22, 22', 22'', and 22''' and for controlling the hydraulic drive for moving the distributor boom 18 about the vertical axis of rotation 17 using a controller 40. The controller 40 thus allows both a movement of the output element 36 of the tool 32 and different distributor boom poses and different positions of the tool 32 relative to the distributor boom to be set.

Figure 2:
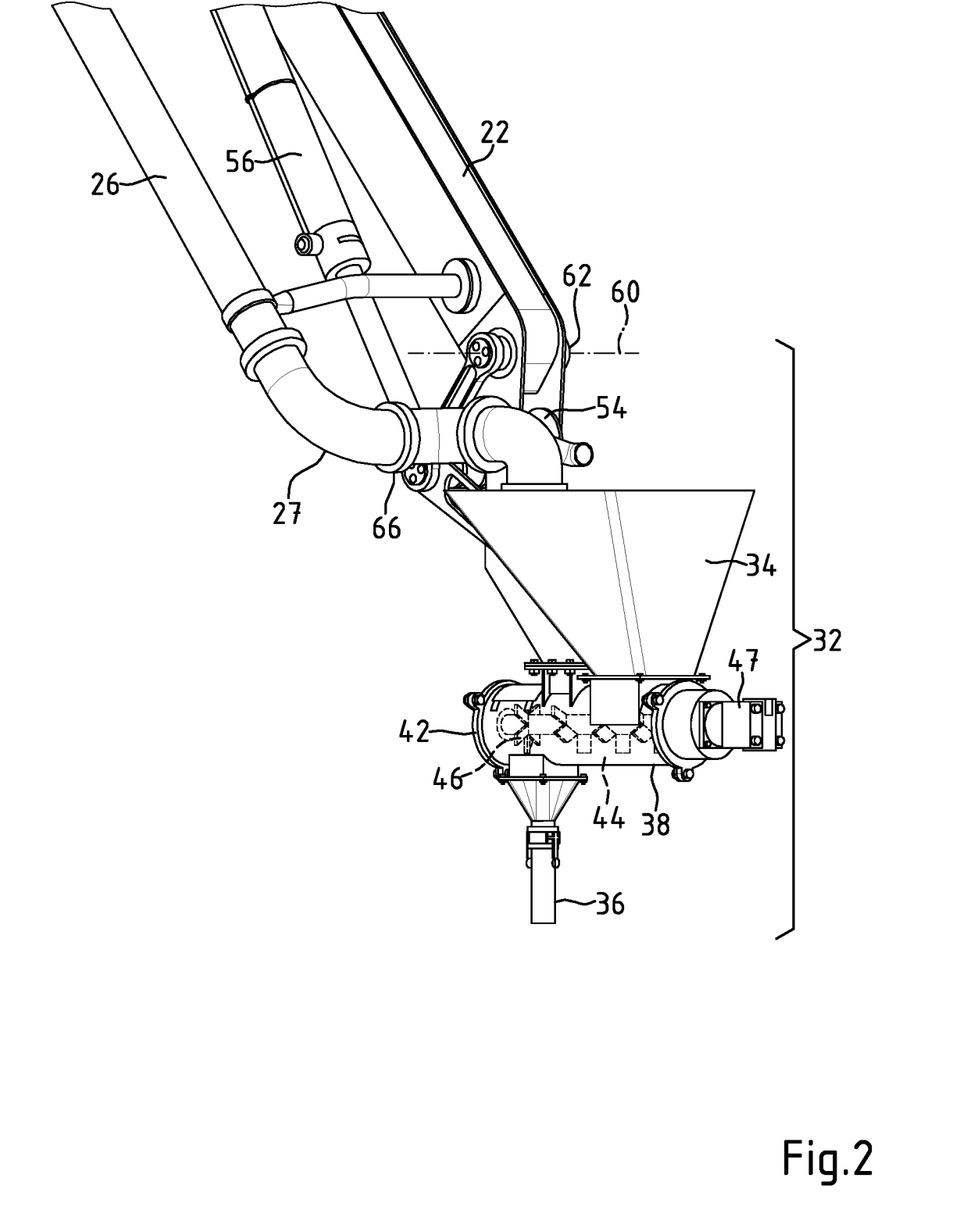
FIG. 2 is a first partial view of the distributor boom.
Figure 3:
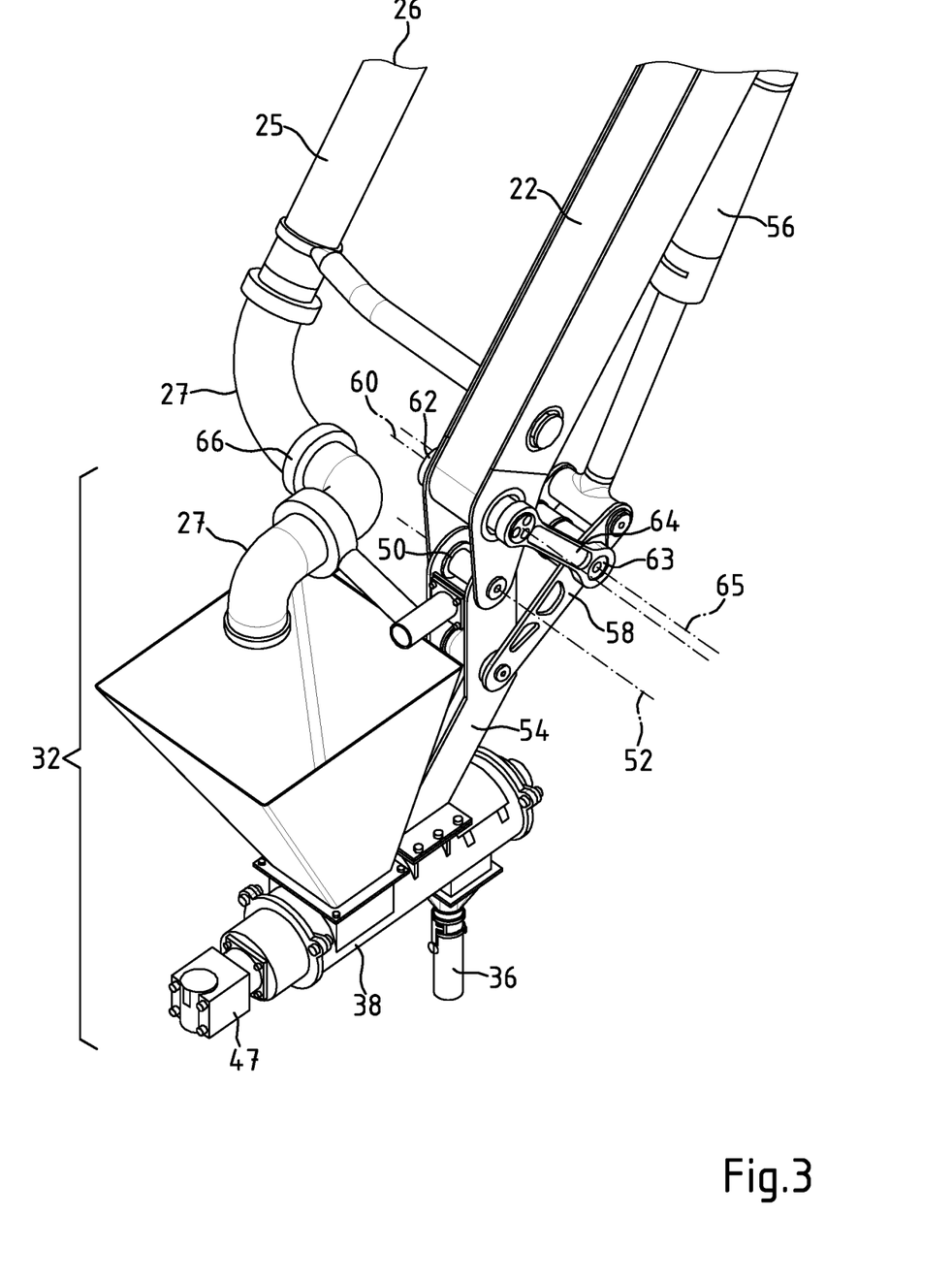
FIG. 3 is a second partial view of the distributor boom.
Figure 4:
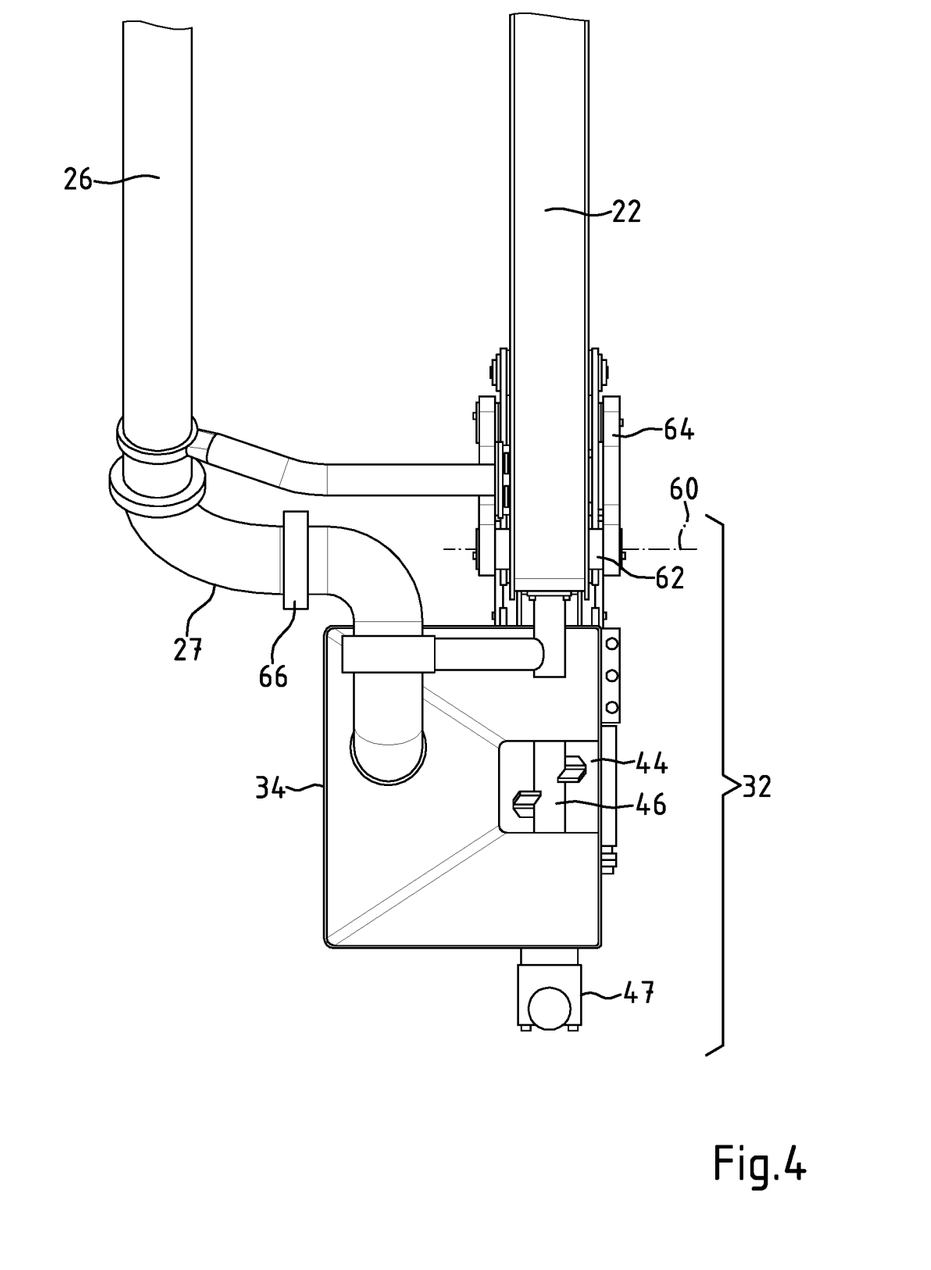
FIG. 4 is a third partial view of the distributor boom.

FIG. 2 is a partial view of the distributor boom 18. In FIGS. 3 and 4, further views of the distributor boom 18 can be seen in different perspectives.

The illustrated conveying apparatus 38 is a screw conveying apparatus. The conveying apparatus 38 has a casing 42 which has a cavity 44 which is connected to the buffer vessel 34 and which communicates with the output element 36. The cavity 44 of the casing 42 is connected to the receiving volume of the buffer vessel 34 via an opening in the bottom of the buffer vessel 34. At least one screw conveyor 46 for the continuous feed of the process material to the output element 36 is arranged in the cavity 44 of the casing 42. The screw conveyor 46 is driven by means of a hydraulic drive motor 47. It should be noted that an electric drive motor can alternatively be provided as the drive for the screw conveyor 46. In another alternative embodiment, the conveying apparatus 38 can also contain two conventionally operated screw conveyors in order to move pasty media fed into the cavity 44 from the buffer vessel 34. In addition, in an alternative embodiment, the conveying apparatus 38 can also be designed as a compressed air conveyor.

The output element 36, which is designed as a nozzle in the illustrated embodiment, is used for shaping the process material. The output element 36 forms the process material fed from the buffer vessel 34 by means of the conveying apparatus 38 into a process material bead when the process material is continuously fed from the buffer vessel 34, by means of the conveying apparatus 38. At an output location 48 of the output element 36, the process material from the buffer vessel 34 can thus be provided with a volume flow precisely defined in terms of location and time, in order to allow material to be precisely applied in layers in the manner of a 3D printer.

The device for the output of the process material in the tool 32 is rotatably mounted about an axis of rotation 52 in a rotating joint 50 received on the distributor boom 18. The axis of rotation 52 of the rotating joint 50 is a horizontal axis of rotation. The device for the output of the process material in the tool 32 has a holding arm 54 connected to the rotating joint 50 and has, as a drive for moving the device for the output of the process material on the holding arm 54 about the axis of rotation 52, the hydraulic cylinder 56 connected to the boom arm 22. The hydraulic cylinder 56 acts on a coupling gear with a first deflection lever arrangement 58 connected to the holding arm 54, which deflection lever arrangement 58 is received in a rotating joint 62 comprising a first horizontal axis of rotation 60 on a link arrangement 64 rotatably mounted on the boom arm 22 in a further rotating joint 63 about a further horizontal axis of rotation 65. The deflection lever arrangement 58 transmits a torque introduced from the hydraulic cylinder 56 about the first horizontal axis of rotation 60 to the holding arm 54. By suitably adjusting the hydraulic cylinder 56, the buffer vessel 34 can always be held in a horizontal position even when the orientation of the distributor boom 18 is changed.

The process material delivery line 26 has a rotating coupling 66 with an axis of rotation that is coaxial with the axis of rotation 52 of the rotating joint 50 that receives the device for the output of the process material. A brace directly connecting the process material delivery line to the holding arm is shown in FIG. 3.

The control system, e.g., controller 40, of the truck-mounted concrete pump 10 preferably allows the open- and/or closed-loop control of a horizontal position and orientation of the tool 32 having the device for the output of the process material by moving about the axis of rotation 52 of the rotating joint 50 receiving the device for the output of the process material. The system for the open- and/or closed-loop control of a position and orientation of the tool 32 in the controller 40 can also be operatively connected to a position and orientation sensor for detecting the position and orientation of the output element and/or to an angle sensor for detecting the angle between the device for the output of the process material and the boom arm 22 receiving the device for the output of the process material in the rotating joint 50.

It should be noted that, in a further modified embodiment, it can be provided that the geometric shape of the process material bead emerging from the nozzle at an output location is adjustable. For example, the nozzle may have a controllably adjustable nozzle mouth with an outlet opening, the geometry of which can be changed. In a further, modified embodiment of the tool 32, a process material outlet opening of the nozzle can be displaced relative to the buffer vessel 34. It should also be noted that the tool 32 can further process the process material conveyed through the process material delivery line 26, in particular, means for feeding process material additives into the buffer vessel 34 by a line connected directly to the casing 42 of the conveyor device 38 for the feed of process material additives, which opens into the cavity 44 with the conveyor screw 46, or through a line for the feed of process material additives such as, for example, air or gaseous, liquid or solid chemicals, which communicates with a nozzle chamber in the output element 36 designed as a nozzle for the process material and which, like the process material delivery line 26, is received on the boom arms 22, 22', 22" and 22" of the distributor boom 18.

It is advantageous if the tool 32, in an embodiment of the invention modified from the embodiment described above, can also be connected to the distributor boom 18 with a quick hitch.

Figure 5:
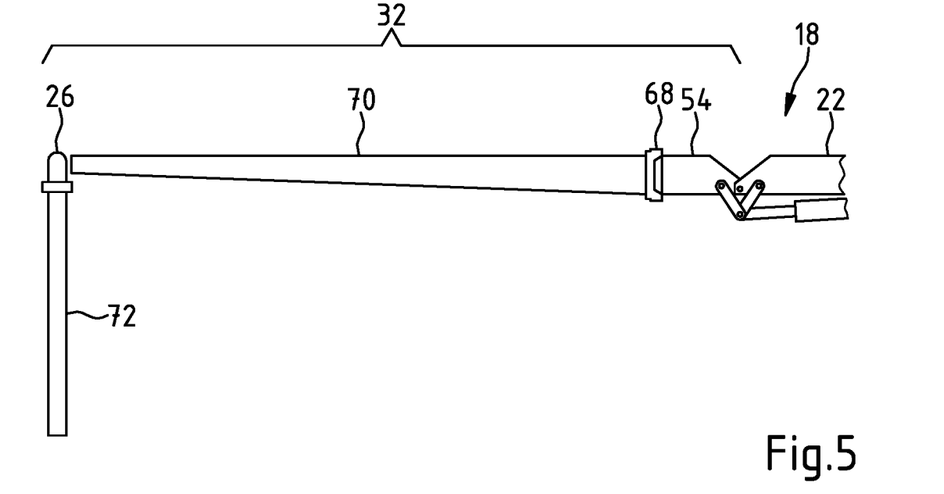
FIG. 5 is a partial view of a further distributor boom having a quick hitch for exchanging tool portions connected to the holding arm of a tool received on the distributor boom.
Figure 6:
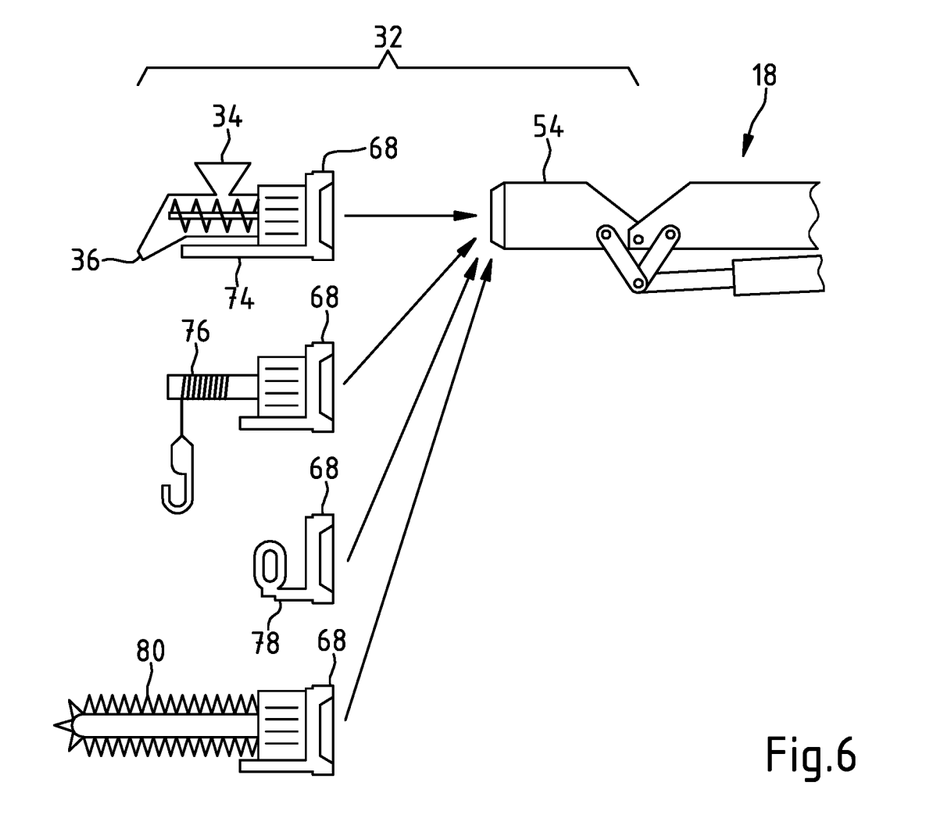
FIG. 6 is another partial view of the distributor boom of FIG. 5 having a quick hitch for exchanging tool portions connected to the holding arm of a tool received on the distributor boom.

FIGS. 5 and 6 are partial views of a further distributor boom 18 having a quick hitch 68 for exchanging tool portions connected to the holding arm 54 of a tool 32 received on the distributor boom 18.

The tool 32 shown in FIG. 5 has, as a tool portion detachably connected to the holding arm 54 by means of the quick hitch 68, a connection arm 70 with a process material delivery line 26 and with an end hose 72.

FIG. 6 shows, as different tool portions that can be connected to the holding arm 54 by means of the quick hitch 68, a print head and/or spray device 74, first and second load handling means 76, 78, and a saw 80. The print head and/or spray device 74 contains a buffer vessel 34 and has an output element 36 for the output of a process material fed through a process material delivery line of the distributor boom 18.

In summary, it is noted: An apparatus for the output of a fluid process material, in particular a process material in the form of concrete, mortar or adhesive, has been disclosed and includes a distributor boom comprising a plurality of boom arms 22, 22', 22", 22"', connected to each other at joints 20, 20', 20", 20"', having a process material delivery line 26 consisting of a plurality of pipe segments 25, which are preferably joint-connected to each other by pipe bends 27 and rotating couplings 66, are guided along the individual boom arms 22, 22', 22", 22" and are fixed thereto, and a tool 32 which is received on the distributor boom 18 and has a device for the output of the process material. The device for the output of the process material has a buffer vessel 34, to which the process material can be supplied from the process material delivery line 26, and contains an output element 36 for the output of the process material, fed from the buffer vessel 34, at an output location 48.

In particular, various embodiments of the apparatus may have the following aspects:

Aspect 1: an apparatus for the output of a fluid process material, in particular a process material in the form of concrete, mortar or adhesive, comprising a distributor boom comprising a plurality of boom arms (22, 22', 22", 22"), connected to each other at joints (20, 20', 20", 20"'), having a process material delivery line (26) consisting of a plurality of pipe segments (25), which are preferably joint-connected to each other by pipe bends (27) and rotating couplings (66), are guided along the individual boom arms (22, 22', 22", 22') and are fixed thereto, and a tool (32) which is received on the distributor boom (18) and has a device for the output of the process material, characterized in that the tool (32) has a buffer vessel (34), to which the process material can be applied from the process material delivery line (26), and contains an output element (36) for the output of process material, fed from the buffer vessel (34), at an output location.

Aspect 2: an apparatus according to aspect 1, characterized in that the tool (32) contains a conveying apparatus (38) for the continuous feed of the process material from the buffer vessel (34) to the output element (36).

Aspect 3: an apparatus according to aspect 2, characterized in that the conveying apparatus (38) has a casing (42) which has a cavity (44) connected to the buffer vessel (34) and communicating with the output element (36).

Aspect 4: an apparatus according to aspect 3, characterized in that at least one screw conveyor (46) is arranged in the cavity (44) of the casing (42) for the continuous feed of the process material to the output element (36).

Aspect 5: an apparatus according to aspect 2, characterized in that the conveying apparatus (38) is designed as a compressed air conveyor.

Aspect 6: an apparatus according to any of aspects 1 to 5, characterized in that the output element (36) is designed as a nozzle which forms the process material.

Aspect 7: an apparatus according to aspect 6, characterized by control means, e.g., controller 40, for displacing a process material outlet opening of the nozzle relative to the buffer vessel (34).

Aspect 8: an apparatus according to any of aspects 1 to 7, characterized in that the tool (32) is rotatably mounted in a rotating joint (50) on the distributor boom (18).

Aspect 9: an apparatus according to aspect 8, characterized in that the rotating joint (50) has a horizontal axis of rotation (52).

Aspect 10: an apparatus according to either aspect 8 or aspect 9, characterized in that the tool (32) has a holding arm (54) connected to the rotating joint (50).

Aspect 11: an apparatus according to any of aspects 8 to 10, characterized by a drive means, e.g., an hydraulic drive having a hydraulic cylinder, for moving the device for the output of the process material on the holding arm (54) about the axis of rotation (52).

Aspect 12: an apparatus according to aspect 11, characterized in that the drive means has a hydraulic cylinder (56) connected to a boom arm (22), which hydraulic cylinder (56) also acts on a drive for rotating the arm comprising the holding arm relative to the boom arm with a first deflection lever arrangement (58) connected to the holding arm (54), which deflection lever arrangement (58) is received in a rotating joint (62) comprising a first horizontal axis of rotation (60) on a link arrangement (64) rotatably mounted on the boom arm (22) about a further horizontal axis of rotation (65), the deflection lever arrangement (58) transmitting a torque introduced from the hydraulic cylinder (56) about the first horizontal axis of rotation (60) to the holding arm (54).

Aspect 13: an apparatus according to aspect 12, characterized by a quick hitch for the detachable connection of the holding arm (54) to a portion of the tool (32) comprising the buffer vessel (34) and the output element (36).

Aspect 14: an apparatus according to any of aspects 11 to 13, characterized in that the process material delivery line (26) has a rotating coupling (66) with an axis of rotation (52) which is coaxial relative to the axis of rotation (52) of the rotating joint (50) receiving the tool (32) having the device for the output of the process material.

Aspect 15: an apparatus according to any of aspects 11 to 14, characterized by a system for the open- and/or closed-loop control of the position and orientation of the tool (32) for the output of the process material by moving it about the axis of rotation (52).

Aspect 16, an apparatus according to aspect 15, characterized in that the system for the open- and/or closed-loop control of the position and orientation of the tool (32) has a position and orientation sensor for detecting the position and orientation of the output element (36) and/or an angle sensor for detecting a rotation angle of the holding arm (54) relative to the boom arm (22) receiving the tool (32) having the device for the output of the process material in the rotating joint (50).

Aspect 17: an apparatus according to any of aspects 1 to 16, characterized in that the tool (32) contains means for further processing the process material conveyed through the process material delivery line (26), in particular means for feeding process material additives into the buffer vessel.

Aspect 18: a truck-mounted concrete pump for the output of a fluid process material, in particular a process material in the form of concrete, mortar, plaster, or adhesive mixed with quartz sand, comprising a distributor boom designed as an articulated boom and comprising a plurality of boom arms (22, 22', 22'', 22'''), connected to each other at joints (20, 20', 20'', 20'''), having a process material delivery line (26) consisting of a plurality of pipe segments (25), which are joint-connected to each other by pipe bends (27) and rotating couplings (66), are guided along the individual boom arms (22, 22', 22'', 22') and are fixed thereto, comprising a process material conveyor pump (30) designed as a piston pump or as a rotor hose pump, which is used for the feed of the process material from a material feed vessel (31) into the process material delivery line (26) and feeding the process material in the process material delivery line (26), and a tool (32) which is received on the distributor boom (18) and has a device for the output of the process material, characterized in that the tool (32) has a buffer vessel (34), to which the process material can be applied from the process material delivery line (26), and has a receiving volume for the buffering of process material that is fed in a pulsed manner via the process material delivery line (26), and an output element (36) for the output of process material, fed from the buffer vessel (34), at an output location, and a conveying apparatus (38) for the continuous feed of the process material from the buffer vessel (34) to the output element (36), which has a casing (42) which has a cavity (44) which is connected to the receiving volume of the buffer vessel (34) via an opening in the bottom of the buffer container (34) and communicates with the output element (36), wherein at least one screw conveyor (46) for the continuous feed of the process material to the output element (36) is arranged in the cavity (44), wherein the tool (32) is rotatably mounted in a rotating joint (50) on the distributor boom (18) and has a holding arm (54) connected to the rotating joint (50), and a drive means for moving the device for the output of the process material on the holding arm (54) about a horizontal axis of rotation (52), which has a hydraulic cylinder (56) connected to boom arm (22), which hydraulic cylinder (56) also acts on a drive for rotating the arm comprising the holding arm relative to the boom arm with a deflection lever arrangement (58) connected to the holding arm (54), which deflection lever arrangement (58) is received in a rotating joint (62) comprising a first horizontal axis of rotation (60) on a link arrangement (64) rotatably mounted on the boom arm (22) about a further horizontal axis of rotation (65), the deflection lever arrangement (58) transmitting a torque introduced from the hydraulic cylinder (56) about the first horizontal axis of rotation (60) to the holding arm (54).

Aspect 19: the truck-mounted concrete pump according to aspect 18, characterized in that the conveying apparatus (38) is designed as a compressed air conveyor.

Aspect 20: the truck-mounted concrete pump according to either aspect 18 or aspect 19, characterized in that the output element (36) is designed as a nozzle which forms the process material.

Aspect 21: the truck-mounted concrete pump according to aspect 20, characterized by control means for displacing a process material outlet opening of the nozzle relative to the buffer vessel (34).

Aspect 22: the truck-mounted concrete pump according to any of aspects 18 to 21, characterized by a quick hitch for the detachable connection of the holding arm (54) to a portion of the tool (32) comprising the buffer vessel (34) and the output element (36).

Aspect 23: the truck-mounted concrete pump according to any of aspects 18 to 22, characterized in that the process material delivery line (26) has a rotating coupling (66) with an axis of rotation (52) which is coaxial relative to the axis of rotation (52) of the rotating joint (50) receiving the tool (32) having the device for the output of the process material.

Aspect 24: the truck-mounted concrete pump according to any of aspects 18 to 23, characterized by a system for the open- and/or closed-loop control of the position and orientation of the tool (32) for the output of the process material by moving it about the axis of rotation (52).

Aspect 25: the truck-mounted concrete pump according to aspect 24, characterized in that the system for the open-and/or closed-loop control of the position and orientation of the tool (32) has a position and orientation sensor for detecting the position and orientation of the output element (36) and/or an angle sensor for detecting a rotation angle of the holding arm (54) relative to the boom arm (22) receiving the tool (32) having the device for the output of the process material in the rotating joint (50).

Aspect 26: the truck-mounted concrete pump according to any of aspects 18 to 25, characterized in that the tool (32) contains means for further processing the process material conveyed through the process material delivery line (26), in particular means for feeding process material additives into the buffer vessel.

Aspect 27: the truck-mounted concrete pump according to any of aspects 18 to 26, characterized in that the buffer vessel (34) is funnel-shaped.

While this invention has been described as having an exemplary design, the present invention may be further modified within the spirit and scope of this disclosure. This application is therefore intended to cover any variations, uses, or adaptations of the invention using its general principles.

LIST OF REFERENCE SIGNS

10 Truck-mounted concrete pump
12 Chassis
14 Substructure
16 Boom pedestal
17 Vertical axis of rotation
18 Distributor boom
20, 20', 20", 20''' Joint
22, 22', 22", 22''' Boom arm
24 Drive unit
25 Pipe segment
26 Process material delivery line
27 Pipe bend
30 Process material conveyor pump
31 Material feed vessel
32 Tool
34 Buffer tank
36 Output element
38 Conveying apparatus
40 Controller
42 Casing
44 Cavity
46 Screw conveyor
47 Hydraulic drive motor
48 Output location
50 Rotating joint
52 Axis of rotation
54 Holding arm
56 Hydraulic cylinder
58 First deflection lever arrangement
60 First horizontal axis of rotation
62 Rotating joint
63 Further rotating joint
64 Link arrangement
65 Further horizontal axis of rotation
66 Rotating coupling
68 Quick hitch
70 Connecting arm
72 End hose
74 Print head and/or spray device
76, 78 Load handling means
80 Saw

What is claimed is:

1. A truck-mounted concrete pump for the output of a fluid process material comprising:
   a distributor boom having an articulated boom which includes a plurality of boom arms connected to each other at joints, the distributor boom further having a process material delivery line having a plurality of pipe segments which are connected to each other by pipe bends and rotating couplings, the process material delivery line extending along the individual boom arms and being supported thereon;
   a process material conveyor pump which feeds the process material from a material feed vessel into the process material delivery line, the process material delivery line delivering the process material to a tool, the tool being supported on the distributor boom and having a device for the output of the process material; and
   wherein the tool has a buffer vessel which receives the process material from the process material delivery line in a receiving volume of the buffer vessel and a conveying apparatus for the feed of the process material from the buffer vessel wherein the buffer vessel receives the process material from the process material delivery line in a pulsed manner and the conveying apparatus providing a continuous feed of the process material from the buffer vessel to an output element whereby the buffer vessel buffers the supply of the process material from the process material delivery line; the output element outputs the process material from the buffer vessel at an output location;
   wherein the conveying apparatus has a casing with a cavity which is in communication with the receiving volume of the buffer vessel through an opening in a bottom portion of the buffer vessel and communicates with the output element, and at least one screw conveyor for the continuous feed of the process material to the output element is arranged in the cavity;

wherein the tool is rotatably mounted at a rotating joint on the distributor boom and has a holding arm which is connected to the rotating joint and supports the output element, and wherein a hydraulic drive moves the output element on the holding arm about a horizontal axis of rotation, the hydraulic drive having a hydraulic cylinder and being connected to a distal one of the plurality of boom arms, the hydraulic drive configured to rotate the holding arm relative to the boom arm with a deflection lever arrangement connected to the holding arm, wherein a link arrangement is rotatably mounted on the distal one of the plurality of boom arms with a rotating joint defining a first horizontal axis and the deflection lever arrangement is rotatably coupled with the link arrangement thereby defining a further horizontal axis of rotation and wherein the deflection lever arrangement transmits torque from the hydraulic drive about the first horizontal axis of rotation to the holding arm; and further comprising a brace directly connecting the process material delivery line to the holding arm.

2. The truck-mounted concrete pump according to claim 1, wherein the conveying apparatus is a compressed air conveyor.

3. The truck-mounted concrete pump according to claim 1, wherein the output element is a nozzle which forms the process material.

4. The truck-mounted concrete pump according to claim 3, wherein a process material outlet opening of the nozzle is displaceable relative to the buffer vessel.

5. The truck-mounted concrete pump according to claim 1, further comprising a quick hitch for the detachable connection of the holding arm to at least a portion of the tool which includes the buffer vessel and the output element.

6. The truck-mounted concrete pump according to claim 1, wherein one of the rotating couplings of the process material delivery line defines a coupling axis of rotation which is coaxial with a tool axis of rotation of the rotating joint at which the tool is rotatably mounted on the distributor boom.

7. The truck-mounted concrete pump according to claim 1, further comprising a control system having a controller which controls of a position and an orientation of the tool for the output of the process material by moving the tool about the tool axis of rotation.

8. The truck-mounted concrete pump according to claim 7, wherein the control system includes a position and orientation sensor which detects the position and orientation of the output element and/or an angle sensor which detects a rotational angle of the holding arm relative to the distal one of the plurality of boom arms.

9. The truck-mounted concrete pump according to claim 1, wherein the tool further comprises means for further processing the process material by feeding process material additives into the buffer vessel.

10. The truck-mounted concrete pump according to claim 9, wherein the means for further processing the process material comprises a line connected directly to the casing of the conveyor device and opening into the cavity in which the at least one screw conveyor is arranged.

11. The truck-mounted concrete pump according to claim 9, wherein the output element is a nozzle having a nozzle chamber and the means for further processing the process material comprises a line which feeds additives to the nozzle chamber.

12. The truck-mounted concrete pump according to claim 1, wherein the buffer vessel is funnel-shaped.

13. The truck-mounted concrete pump according to claim 1, wherein the conveyor pump is a piston pump or a rotor hose pump.

14. The truck-mounted concrete pump according to claim 1, further comprising a control system having a position sensor which detects a position of the output element and a controller which controls a position of the tool for the output of the process material by moving the tool about the tool axis of rotation.

15. The truck-mounted concrete pump according to claim 14, wherein the control system further comprises an angle sensor which detects a rotational angle of the holding arm relative to the distal one of the plurality of boom arms.

16. The truck-mounted concrete pump according to claim 1, wherein the hydraulic drive pivots the buffer vessel and the at least one screw conveyor about the horizontal axis of rotation by adjusting the hydraulic cylinder relative to the distal one of the plurality of boom arms to thereby maintain the buffer vessel and the at least one screw conveyor in a horizontal position when a pose of the distributor boom is changed.

17. The truck-mounted concrete pump according to claim 16, wherein the at least one screw conveyor is arranged in, and an axis of a cylinder rod of the hydraulic cylinder extends in a plane perpendicular to the horizontal axis of rotation.

18. The truck-mounted concrete pump according to claim 1, further comprising a line for supplying process material additives wherein the output element is a nozzle having a nozzle chamber and the line for supplying process material additives communicates with the nozzle chamber.

19. The truck-mounted concrete pump according to claim 1, wherein the output element is a nozzle which forms the process material, the nozzle having a controllably adjustable nozzle mouth with an outlet opening, the outlet opening having a changeable geometry.

20. The truck-mounted concrete pump according to claim 1, wherein a line for supplying process material additives is directly connected to the casing of the conveying apparatus and opens into the cavity of the casing.

21. The truck-mounted concrete pump according to claim 1, wherein the output element is a nozzle which forms the process material, the nozzle having a controllably adjustable nozzle mouth with an outlet opening, the outlet opening having a changeable geometry and wherein the outlet opening of the nozzle is displaceable relative to the buffer vessel;
    wherein a first line for supplying process material additives is directly connected to the casing of the conveying apparatus and opens into the cavity of the casing; and
    the nozzle includes a nozzle chamber and a second line for supplying process material additives communicates with the nozzle chamber.

22. The truck-mounted concrete pump according to claim 21, wherein the hydraulic drive pivots the buffer vessel and the at least one screw conveyor about the horizontal axis of rotation by adjusting the hydraulic cylinder relative to the distal one of the plurality of boom arms to thereby maintain the buffer vessel and the at least one screw conveyor in a horizontal position when a pose of the distributor boom is changed.

* * * * *